US010009340B2

(12) United States Patent
Redberg

(10) Patent No.: US 10,009,340 B2
(45) Date of Patent: Jun. 26, 2018

(54) SECURE, AUTOMATIC SECOND FACTOR USER AUTHENTICATION USING PUSH SERVICES

(71) Applicant: Fortinet, Inc., Sunnyvale, CA (US)

(72) Inventor: David A. Redberg, New York, NY (US)

(73) Assignee: Fortinet, Inc., Sunnyvale, CA (US)

( * ) Notice: Subject to any disclaimer, the term of this patent is extended or adjusted under 35 U.S.C. 154(b) by 168 days.

(21) Appl. No.: 15/080,963

(22) Filed: Mar. 25, 2016

(65) Prior Publication Data
US 2017/0279795 A1 Sep. 28, 2017

(51) Int. Cl.
G06F 7/04 (2006.01)
G06F 15/16 (2006.01)
G06F 17/30 (2006.01)
H04L 29/06 (2006.01)

(52) U.S. Cl.
CPC ...... *H04L 63/0838* (2013.01); *H04L 63/0861* (2013.01); *H04L 63/10* (2013.01); *H04L 2463/082* (2013.01)

(58) Field of Classification Search
CPC .. H04L 63/0838; H04L 63/0861; H04L 63/10
USPC .......................................................... 726/4
See application file for complete search history.

(56) References Cited

U.S. PATENT DOCUMENTS

2007/0067828 A1* 3/2007 Bychkov ............... G06F 21/31 726/3
2007/0130474 A1* 6/2007 Shatford ................ H04L 9/12 713/184
2011/0321146 A1* 12/2011 Vernon ................. G06F 21/35 726/7
2013/0139222 A1* 5/2013 Kirillin .................. H04L 67/02 726/4
2014/0250490 A1* 9/2014 Baca ..................... H04L 9/3228 726/1
2015/0188891 A1* 7/2015 Grange ............... H04L 63/0428 380/270

(Continued)

OTHER PUBLICATIONS

Mohamed Hamdy Eldefrawy; OTP-Based Two-Factor Authentication Using Mobile Phones; IEEE: 2011; p. 327-331.*

Primary Examiner — Monjour Rahim
(74) Attorney, Agent, or Firm — Hamilton, DeSanctis & Cha LLP

(57) ABSTRACT

A network-based multi-factor authentication approach is provided. A request to access a protected network resource and user credentials are received from a client by an application server hosting the resource. Attributes associated with the request are obtained. After determining the credentials are valid, the access attributes are provided to an authentication server. A first OTP is generated by the authentication server. The client is caused to seek confirmation from the user regarding the request and the associated attributes, by sending a push notification to the client. Responsive to authentication of the user to an OTP generator application running on the client via a biometric sensor or a PIN associated with the client: (i) a second OTP is generated by the OTP generator; and (ii) the application server is caused to grant the request by the OTP generator sending the second OTP to the application server or to the authentication server.

14 Claims, 8 Drawing Sheets

(56) References Cited

U.S. PATENT DOCUMENTS

2015/0365402 A1* 12/2015 Woo .................... H04L 63/0838
  726/6
2016/0036807 A1* 2/2016 Knauss ............... H04L 63/0838
  726/7

* cited by examiner

SECURE, AUTOMATIC SECOND FACTOR USER AUTHENTICATION USING PUSH SERVICES

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2016, Fortinet, Inc.

BACKGROUND

Field

Embodiments of the present invention generally relate to multi-factor user authentication. In particular, embodiments of the present invention relate to a multi-factor authentication approach that makes use of push-service based resource access verification and seamless One-Time Password (OTP) generation based validation.

Description of the Related Art

Traditional (static) password-based authentication, which makes use of something a person knows (e.g., a username, a personal identification number (PIN) and/or other static password) to authenticate an individual, has been in use for a long time. Traditional password-based authentication has several vulnerabilities, including vulnerability to replay attacks, especially when user credentials are transmitted via a public network, such as the Internet, for example, in connection with authenticating a user prior to allowing the user access to a particular network resource (e.g., server/application/device/service). In a network environment in which login credentials are sent by a web browser/application over a network for authentication by a web server/authentication server, intruders/hackers can intercept the login credentials using techniques such as phishing or man-in-the-middle attacks. Several attempts have been made to overcome the problem of static password-based user authentication and two-factor authentication (2FA) or multi-factor authentication (MFA) mechanisms, which use multiple components (e.g., something that the user knows, something that the user possesses (e.g., a bank card, a key, a Universal Serial Bus (USB) stick containing a secret token or other physical object) and/or something that is inseparable from the user (e.g., fingerprint, eye iris, voice, typing speed, key press patterns and/or other biometrics or characteristics of the user)) to confirm the identity of the user.

Two-factor or multi-factor authentication may make use of a one-time password (OTP), which is generated each time a user authentication is required, and which may be used in addition to a traditional (static) password. In existing solutions, an OTP is generated either by a hardware token or by a software-based OTP generator. A hardware token based OTP generator typically requires the user to carry the token everywhere, and is therefore not the most convenient solution for users. To remove the burden of carrying a hardware token, software-based OTP generators have been proposed, which are generally installed on a user device (e.g., a smartphone) to generate a unique OTP as needed. In some solutions, OTPs are generated by an application server and sent to the user, who may receive the OTP through short message service (SMS), email, a phone call or other means, and provide the OTP in addition to or instead of a static password for user authentication.

In a typical two-factor authentication, a user provides his/her login credentials (username and password), also interchangeably referred to as user credentials, and then provides the OTP for user authentication to a web/authentication server, which verifies the entered password and the OTP to authenticate the user. In a typical scenario, user authentication is performed using a web-browser or a web-application, which allows the user to manually enter the user credentials and the OTP to be authenticated for obtaining access to a network resource.

Common problems with existing solutions for user authentication include security, ease of use, privacy, and deployment issues. For instance, with OTP-based two-factor user authentication, users face two main issues, namely security and ease of use. OTP based two-factor authentication is not very easy to use, especially when the software-based OTP generator is present on the same device (e.g., a smartphone) that is attempting to access a network resource requiring user authentication. If the user authentication is being processed through a web application or a web browser, for example, the user needs to either copy the OTP from the generator application or remember the OTP, and then paste/enter the OTP into the web application or web browser. This may require the user to flip/switch between the OTP generator application and the web application, thereby creating usability issues. For example, such switching among multiple applications makes it difficult (or requires additional time) to access network resources, such as web servers, databases, email, web portals, among others that require 2FA. Systems requiring users to manually enter OTPs are therefore not convenient/preferred by users.

Conventional 2FA solutions where the end user enters the OTP into the web application or web browser are vulnerable to phishing attacks, since a well-disguised malicious site can easily fool an end user into entering their credentials, which can then be used by the hacker to gain access to the legitimate end user's account. Therefore, it is not desirable to require the end user to enter the OTP.

Furthermore, in two-factor authentication scenarios in which the OTP generator also exists on the same device as is being used for the user authentication, there is a risk of malware attacks since the authentication credentials are being generated on the same device. It is therefore desirable for OTP generation to be secure and transparent to the user.

In view of the foregoing limitations/disadvantages of existing solutions, there is a need for systems and methods that facilitate multi-factor authentication while addressing various limitations/disadvantages.

SUMMARY

Systems and methods are described for a network-based multi-factor authentication approach that uses a push service to confirm the validity of a network resource access request received through a first channel by way of an end user authentication through another channel. A request to access the protected network resource and a first set of user credentials, including a user identifier, are received by an application server hosting the protected network resource from the client device. Access attributes associated with the access request are obtained by the application server. Responsive to validating, by the application server or an authentication server, the first set of user credentials, a first one-time password (OTP) is generated by the authentication server and associated with the user identifier. The client device is caused to seek confirmation from the user regarding initiation of the access request and the associated access attributes, by pushing, by the authentication server, the access attributes to the client device through a push server. Responsive to the client device receiving the confirmation from the user in a form of (i) authentication of the user to the client device via a biometric sensor of the client device; or (ii) authentication of the user to an OTP generator application running on the client device via a personal identification number (PIN) associated with the OTP generator application: (i) a second OTP is generated by the OTP generator application that matches the first OTP; and (ii) the application server is caused to grant the access request by the OTP generator application sending the second OTP to the application server or to the authentication server.

According to one embodiment, a method of granting a user of a client device access to a protected network resource is provided.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
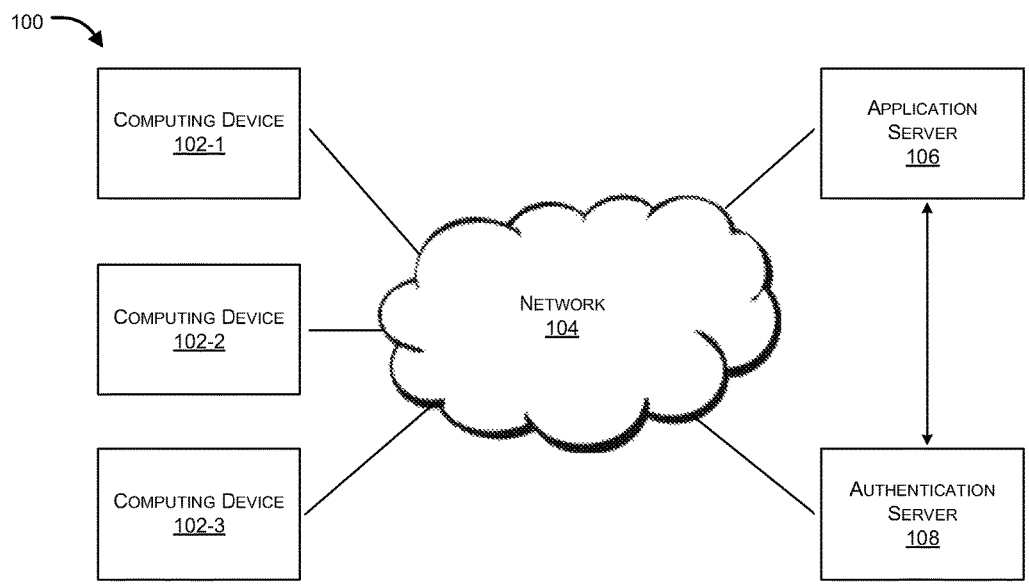
FIG. 1 illustrates exemplary network architecture in accordance with an embodiment of the present invention.

Systems and methods are described for a network-based multi-factor authentication approach that uses a push service to confirm the validity of a network resource access request received through a first channel by way of an end user authentication before providing the second factor via a different channel. In the following description, numerous specific details are set forth in order to provide a thorough understanding of embodiments of the present disclosure. It will be apparent to one skilled in the art that embodiments of the present disclosure may be practiced without some of these specific details.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of conducting user authentication, it should be appreciated that the same has been done merely to illustrate the disclosure in an exemplary manner and any other purpose or function for which the explained structure or configuration can be used, is covered within the scope of the present disclosure.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named Systems and methods are described for a network-based multi-factor authentication approach that uses a push service to confirm the validity of a network resource access request received through a first channel by way of a biometric authentication of an end user through another channel.

In an aspect, the present disclosure provides a method of granting a user of a client device access to a protected network resource, wherein the method comprises the steps of receiving from the client device, by an application server hosting the protected network resource, a request to access the protected network resource; and receiving from the client device, by the application server, a first set of user credentials, having at least a user identifier of the user. The method further comprises the steps of obtaining, by the application server, access attributes associated with the access request; and responsive to determining, by the application server, that the first set of user credentials are valid, providing to an authentication server, by the application server, the user identifier and the access attributes.

The method further comprises the step of generating, by the authentication server, a first one-time password (OTP) associated with the user identifier. The method further comprises causing an the client device to seek confirmation from the user regarding initiation of the access request and the associated access attributes, by pushing, by the authentication server, the access attributes to the client device through a push server, wherein, responsive to receiving the confirmation from the user by the client device in a form of authentication of the user via a biometric sensor of the client device or a PIN associated with an OTP generator application running on the client device, the method further comprises the steps of generating, by the OTP generator application, a second OTP that matches the first OTP; and causing, by the OTP generator application, the application server to grant the access request by sending the second OTP to the application server or to the authentication server.

In an aspect, the access attributes can include one or more of a time associated with the access request, a geographic location from which the access request originated, and a device identifier associated with the client device. In another aspect, the client device can include a mobile phone, a smart watch, a smart phone, a tablet computer, a desktop computer or a laptop computer.

Non-limiting examples of OTP algorithms that may be used by the OTP generator application include a time-based OTP algorithm, an event-based OTP algorithm and a hash-based message authentication code (HMAC) OTP algorithm.

In yet another aspect, the biometric sensor can include a fingerprint sensor. In another aspect, the first set of user credentials can include the user identifier and a password corresponding to the user identifier. In an aspect, the step of receiving from the client device, by the application server, a first set of user credentials, can include receiving from a browser running on the client device, by the application server, the first set of user credentials.

The present disclosure further relates to a system for granting a user of a client device access to a protected network resource, wherein system can include a user credential receive module configured to, at an application server hosting the protected resource, receive, from the client device, a request along with a first set of user credentials having at least a user identifier of the user, to access the protected network resource. The system can further include an access attribute determination module configured to determine, at the application server, access attributes associated with the access request. The system can further include a user credential validation module configured to, at the application server, validate the first set of user credentials and send the user identifier and the access attributes to an authentication server responsive to successful validation of the first set of user credentials.

Alternatively, the first set of user credentials can be sent, along with the user identifier and the access attributes to the authentication server for validation. The system can further include a first OTP generation module configured to, at the authentication server, generate a first one-time password (OTP) associated with at least a part of the user identifier; and a push server based user verification information transmission module configured to push, to the client device from the authentication server, through a push server, a notification regarding the access request and the corresponding access attributes. Responsive to confirmation of the access request and the access attributes from the user in a form of authentication to an OTP generator application via a biometric sensor or a PIN associated with the OTP generator application, a second OTP generation module generates a second OTP that matches the first OTP and sends the second OTP to the application server or to the authentication server. The system includes a second OTP based user access determination module configured to, at the application server, grant access to the protected network resource to the client device based on matching of the first OTP and the second OTP.

In an exemplary embodiment, the network resource can be any computing resource, such as data stored at an application server or in a database coupled with the server, CPU resources, storage space, an online application, a password-protected website a malware rule engine, among other resources that make use of multi-factor authentication.

FIG. 1 illustrates exemplary network architecture in accordance with an embodiment of the present invention. As shown in FIG. 1, computing devices, such as computing device 102-1, computing device 102-2, and computing device 102-3, which may be collectively and interchangeably referred to as computer device 102 hereinafter, can request for access to a protected network resource that is managed by an application server 106 through a network 104. In an exemplary implementation, network 104 can be a local area network (LAN), a wide area network (WAN), or the Internet, through which computing device 102, which may also be interchangeably referred to as user device or client device or simply as device hereinafter, can send an access request to application server 106 that is configured to manage protected network resources, such as data, security devices, content-based devices, CPU driven resources, memory space, access of to an Application Programming Interface (API), or some application engine running in/on the application server 106. Computing devices 102 can include, but are not limited to, mobile phones, Personal Digital Assistants (PDAs), tablet computers, laptop computers and desktop personal computers (PCs). As those skilled in the art will appreciate, a protected network resource can also be a network printer, network storage, a network security device, or any other network computing resource. Embodiments of the present disclosure use multi-factor authentication to validate/authenticate a request of a user to access a network resource that is protected/hosted by the application server 106. As explained in further detail below, embodiments of the present disclosure allow computing device 102 to make an access request to access the protected network resource to application server 106 through one communication channel (e.g., a web browser, mobile phone application or a File Transfer Protocol (FTP) client) and makes sure the end user of computing device 102 is verified to computing device 102 device before an OTP is generated and delivered through a second communication channel.

According to an embodiment of the present disclosure, when an access request is received by application server 106 from computing device 102, application server 106 can challenge the user of computing device 102 to enter user credentials, for example, a username and a password, or a voice signature, or a gesture, or any other user credential comprising of at least one user identifier as a first factor of a multi-factor authentication. The access request to application server 106 can be sent through a web browser or through an appropriate user interface (for example FTP client or other user application), wherein application server 106, which can be a web server, upon receiving an access request, can determine access attributes that are associated with the access request for purposes of confirming via a second communication channel that the user associated with the received user credentials initiated the access request. Non-limiting examples of access attributes include a time associated with the access request, a device identifier (e.g., a phone number, a make and model of the client device, the Unique Device Identifier (UDID) of an Apple iOS device, the International Mobile Equipment Identity (IMEI) of a GSM phone, the Mobile Equipment Identifier (MEI) of a CDMA phone) associated with the client device that originated the access request, an Internet Protocol (IP) address of the client device making the access request and the geographical location of the client device that originated the access request.

In an aspect, application server 106 can then be configured to verify the first set of user credentials using, for instance, pre-stored user credentials. The application server 106 can further be configured to evaluate/validate/verify the access attributes associated with the access request. In an exemplary implementation, validation of first set of user credentials and/or of the access attributes can be performed either by the application server 106 itself or by any other computing device, for example an authentication server 108 that is coupled with the application server 106 and that is configured to perform validation of first user credentials.

In an aspect, upon successful verification of the first set of user credentials, application server 106 can forward at least a part of the user credentials, for example, at least one user identifier (e.g., a user ID), along with the access attributes to an authentication server 108. The authentication server 108 can generate a first one-time password (OTP) and can send the first OTP associated with the access request to the application server 106. In an exemplary implementation therefore, the authentication server 108, upon receiving the user identifier and the access attributes can trigger a push server (not shown) to push a notification containing the at least one user identifier and the access attributes to computing device 102 for validation by the user of the computing device 102. In this manner, fraudulent attempts, by someone other than the user associated with the user credentials to access the protected network resource, can be denied.

In an embodiment, client device 102 can include an OTP generator (not shown) that runs on client device 102. After client device 102 receives the push notification containing the at least one user identifier and the access attributes and confirms same with the end user, client device 102 may cause a second factor of the multi-factor authentication to be completed by triggering generation of an OTP by the OTP generator. The user may be required by the client device to validate the access attributes (confirming he/she initiated the access request) and verify her/she is the owner of client device 102 by entering a second set of user credentials (e.g., a PIN associated with the OTP generator or a biometric-input based credential (e.g., (i) Touch-Id, the fingerprint identity sensor used on iPhones or (ii) an authentication phrase to perform voice authentication of the user)). In an exemplary implementation, client device 102 may have an integrated biometric sensor to read a biometric input/credential received from the user, say a fingerprint or a retina scan or a facial recognition system or any other biometric input receiving means, all of which are within the scope of the present disclosure. In an exemplary implementation, upon successful verification of the second set of user credentials locally at client device 102, the OTP generator generates a second OTP that compliments/matches the first OTP generated by authentication server 108. In an exemplary implementation, the second OTP and the first OTP can be generated using symmetric cryptography—using the same OTP generation scheme and common input parameters to generate an OTP by, for example, leveraging the soft token seed provisioning system described in U.S. Pat. No. 9,143,492, which is hereby incorporated by reference in its entirety.

In an aspect, the OTP generator that is configured in client device 102 can send the second OTP either directly to authentication server 108, wherein it can be compared with the first OTP, or indirectly to authentication server 108 via application server 106.

In an exemplary implementation, the access request can be granted by application server 106 responsive to determining the second OTP matches the first OTP. In an exemplary implementation, matching of the first OTP with the second OTP can be performed at application server 106 or at authentication server 108 in order to avoid additional burden on application server 106.

In an exemplary implementation, communications between client device 102, application server 106, authentication server 108, and the push server can be performed using symmetric cryptography.

Embodiments of the present invention provide improved user experience while maintaining a high level of security to network resources wishing to add multi-factor authentication, for example, to a website login process. Embodiments of the present disclosure make use of Push Services (e.g., Google Push) to push notifications associated with the access request to the client device, and a fingerprint sensor (Touch-Id) of the client device to both verify the access request was initiated by the user and verify the user to the client device.

Those skilled in the art will appreciate that embodiments of the present disclosure streamline the multi-factor authentication process as the user need not manually enter an OTP. As explained above, the user may simply use Touch ID (or a PIN or another configured biometric sensor), if available, to verify their identify and confirm access attributes provided within a push notification send responsive to the access request. Embodiments of the present disclosure allow users to easily authenticate themselves using multi-factor authentication from their respective client devices (for example mobile/portable devices/phones 102) without having to flip back and forth between a browser or a mobile application and an OTP generator application to copy an OTP from the OTP generator and paste it to the browser or the mobile application being used to interact with the protected network resource.

Even though the second factor authentication interface (e.g., the OTP generator application) and the user interface (e.g., a web browser) from which the access request is originated, are on the same device, the security remains high as the first factor (e.g., a user ID and a password) of the multi-factor authentication are validated through a different channel than the second factor (e.g., the OTP generated by the OTP generator running on client device 102) of the multi-factor authentication. Furthermore, there is no need for the user to flip between screens as the OTP generator interface may automatically be activated responsive to receipt of the push notification from the push server. Furthermore, the user merely has to verify himself/herself using a biometric or other means (e.g., a PIN of the client device 102 or the OTP generator application), based on which the second OTP may be automatically generated and sent to authentication server 108 or to application server 106 to be matched with the first OTP.

In an exemplary implementation, when an end-user attempts to access a protected network resource (e.g., a file hosted on a web server or content server), using a client device (e.g., his/her mobile browser), the user may be prompted via the browser to enter a first set of user credentials (e.g., login credentials, such as a static password and user name) that are submitted to the server hosting the protected network resource. The web server can then validate the user credentials as usual and pass the user identifier (e.g., the user name) to an authentication server (e.g., a FortiAuthenticator (FAC) user identity management appliance or other user identity management server). The web server may also pass additional information (e.g., access attributes associated with the access request) to the authentication server. The access attributes may include one or more of a source IP address associated with the access request, a geographic location of the client device originating the access request and derived therefrom and a device identifier of the client device originating the access request that can be retrieved therefrom.

Responsive to receipt of the user identifier from the application, web or content server, the authentication server computes a first OTP and sends the user identifier along with one or more of the access attributes to the client device (corresponding to the user identifier) via a push service, along with other information that may be useful to verify the access request. In an exemplary implementation, the push notification causes the client device to display information regarding the access request (e.g., the user identifier and the access attributes). The client device may then require the user to verify/authenticate himself/herself to an OTP generator running on the client device (e.g., using a biometric sensor or a PIN associated with the OTP generator) to confirm his/her initiation of the access request and upon successful authentication, the client device may cause the OTP generator to automatically generate a second OTP that can be securely sent to the web server or to the authentication server to verify against the first OTP. Upon successful verification of the second OTP, the app/web server can grant access of the file/protected resource to the end user.

Notably, while various embodiments described herein describe a first OTP being generated by an authentication server and a second OTP being generated by an OTP generation application running on a client device after receipt of a push notification, those skilled in the art will appreciate that this particular order of OTP generation is not required. For example, the OTP generation application may proactively generate and send a first OTP to the authentication server responsive to initiation of the access request by the client device and the authentication server may generate a second OTP to compare to the first OTP after the user credentials have been validated.

The systems and methods described herein help avoid potential malware threats that may compromise the second factor as the second OTP is not pre-stored on the client device, is generated only after successful authentication of biometric credentials and is transmitted for verification via a different communication channel than the access request. Even if malware on the client device attempted to attack the OTP generator application, the only way to access the OTP generator is by authenticating the user via Touch-Id (or equivalent) or the device PIN, if biometric-based authentication is not supported by the client device. Furthermore, as discussed above, because conventional 2FA solutions where the end user enters the OTP into the web application or web browser are vulnerable to phishing attacks, as such, it is desirable to send the OTP programmatically over an encrypted connection to a trusted authentication server or web application that is responsible for validating the user. Finally, should malware running on the client device somehow spoof the push notification on the client device, the approval by the end user (e.g., using Touch-Id) will still fail to allow the user to access the protected network resource because the OTP will not be sent by the OTP generator as embodiments of the present invention may protect the push notification against Man-in-the-Middle attacks by Secure Sockets Layer (SSL)/Transport Layer Security (TLS) and certificate pinning.

Figure 2:
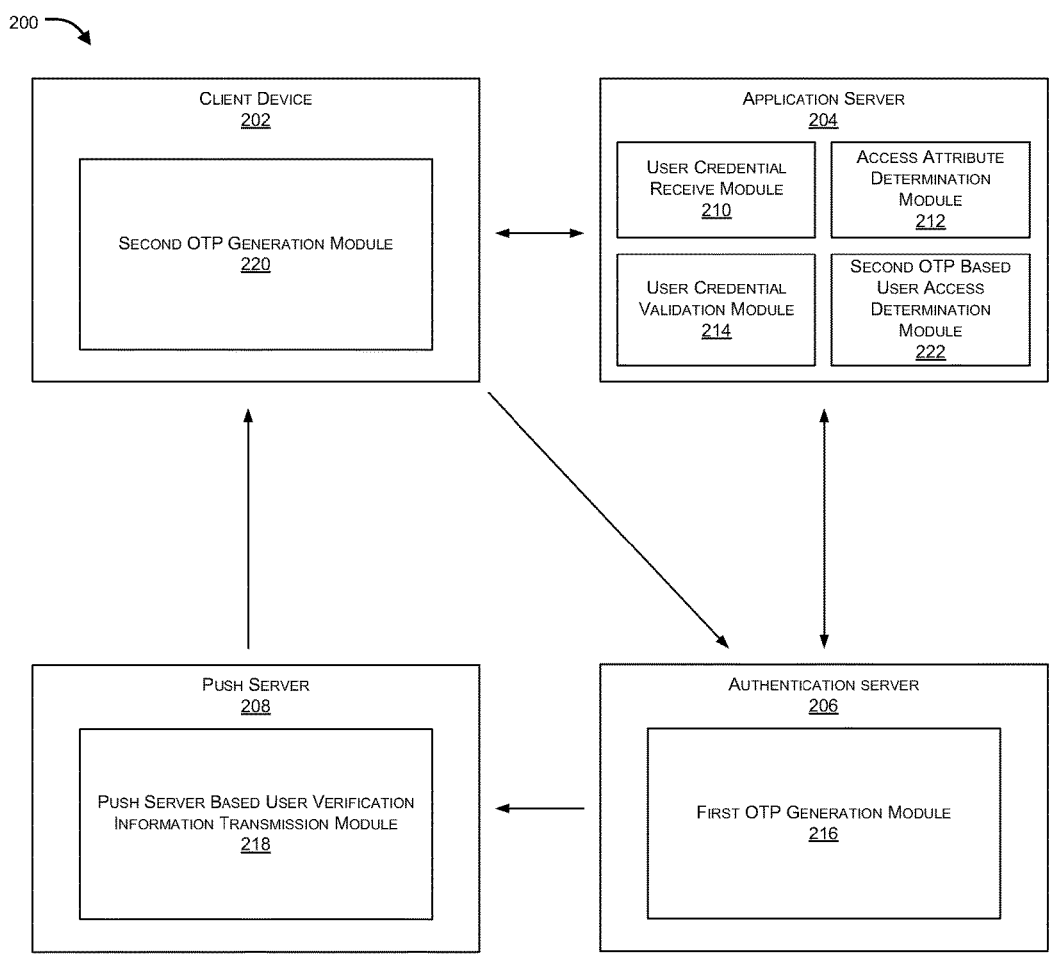
FIG. 2 illustrates exemplary functional modules of a push service and automatic OTP validation based user authentication system in accordance with an embodiment of the present invention.

FIG. 2 illustrates exemplary functional modules of a push service and automatic OTP validation based user authentication system 200 in accordance with an embodiment of the present invention. In the context of the present example, system 200 may be used to facilitate multi-factor authenticated access to a protected network resource. A client device 202 is operatively coupled with an application server 204, an authentication server 206, and a push server 208 over a network. System 200 can include a user credential receive module 210 configured to, at an application server 204 hosting the protected resource, receive, from client device 202, a request along with a first set of user credentials including at least one identifier of the user, to access the protected network resource. System 200 can further include an access attribute determination module 212 configured to, at application server 204, determine access attributes associated with the access request. System 200 can further include a user credential validation module 214 configured to, at application server 204, validate one or a combination of the first set of user credentials and/or the access attributes, and send the user identifier (extracted from the first set of user credentials) and/or the access attributes to authentication server 206 responsive to successful validation the first set of user credentials.

In an exemplary implementation, user credential verification module 214 can be implemented within authentication server 206, and hence application server 204 can pass the received user credentials along with the access attributes to authentication server 206.

System 200 can further include a first OTP generation module 216 configured to, at authentication server 206, generate a first OTP to be associated with the user identifier and the access request. System 200 can further include a push server based user verification information transmission module 218 configured to, at push server 208, push to the user of client device 202, from authentication server 206, through push server 208, a notification regarding the access request and the associated access attributes. System 200 can seek confirmation from the user regarding the push notification (e.g., alerting the user regarding the access request and the associated access attributes). Second OTP generation module 220 can further be configured to generate a second OTP complimentary to the first OTP in response to confirmation by the user of the access request and the access attributes by verifying himself/herself to client OTP generation module 220 via a biometric sensor of client device 202 (or by supplying a PIN associated with OTP generation module 220) and send the second OTP either to application server 204 or to authentication server 206. System can further include a second OTP based user access determination module 222 configured to, at application server 204 or at authentication server 206, grant access to the protected network resource by client device 202 responsive to a determination that the first OTP matches the second OTP.

In an exemplary implementation, where the matching of the second OTP and the first OTP is performed at application server 204, first OTP generation module 216 can be configured to send first OTP from authentication server 206 to application server 204.

In another exemplary implementation, where the matching of the second OTP with the first OTP is performed at authentication server 206, second OTP generation module 220 can be configured to send the second OTP to authentication server 206. In another aspect, the second OTP can be sent from client device 202 to application server 204.

In an exemplary embodiment, the access attributes can include one or more of a time associated with the access request, a geographic location from which the access request originated, and a device identifier associated with the client device. The access attributes can be determined from the access request received at application server 204, wherein the access attributes can be used for evaluating the client device credentials in addition to the user credentials for the first level of verification of the access request at application server 204.

In an exemplary embodiment, first and/or second OTP generation modules can include an OTP generator, which can be a time-based OTP generator or an event-based OTP generator. In an exemplary embodiment, the biometric sensor can be a fingerprint sensor, a retina sensor, or facial recognition sensor/system, embedded within or attached to client device 202. For example, a finger print scanner of client device 202 can work as the biometric sensor. In an exemplary implementation, the time-based OTP generator can compute an OTP based on a shared secret key and the current time. In one embodiment, the time-based OTP combines a secret key with the current timestamp using a cryptographic hash function to generate the OTP. The timestamp typically can be configured to increase in 10-second intervals, so OTPs generated proximate in time and based on the same secret key will be equal. In an exemplary implementation, the first OTP generated by authentication server 206 and the second OTP generated by OTP generator of client device 202 can be configured to use a time-based OTP generator, wherein the OTP generator on authentication server 206 and the OTP generator on client device 202 can use the same cryptographic hash function to generate the first OTP and the second OTP. For the OTP based authentication to work properly, the clocks of authentication server 206 and client device 202 can be synchronized or be based on a common source, so that both client device 202 and authentication server 206 generate the same OTP. In an exemplary implementation, authentication server 206 can be configured to accept OTPs generated from timestamps that differ by ±1 time interval from the client device's timestamp. The examples used herein assume client device 202 and authentication server 206 have been provisioned with a shared secret key to be used for OTP generation. Those skilled in the art will appreciate there are a variety of ways of doing this. In one embodiment, authentication server 206 and client device 202 can be provided with the shared secret key over a secure channel ahead of time using the soft token see provisioning system described in U.S. Pat. No. 9,143, 492, for example. In alternative embodiments, authentication server 206 and client device 202 can be configured to use an event-based OTP algorithm or an HMAC OTP algorithm.

In an exemplary implementation, the first set of user credentials can include any or a combination of a user identifier and a password, a biometric credential, a voice signature, a gesture, or any other credential parameter.

In an exemplary embodiment, network resources to be protected can include any or a combination of computing devices, network security/management devices, one or more files, computing resources, data stored at an application server, CPU, storage space, malware rule engine(s), among other like resources. In an exemplary implementation, the client device, the application server, the authentication server, and the push server can be connected with each other through different interfaces/channels.

In an exemplary implementation, a single physical server may function as both application server 204 and authentication server 206. A non-limiting example of a computer system representative of client device 202, application server 204, authentication server 206 and/or push server 208 is described in further detail below with reference to FIG. 8.

Figure 3:
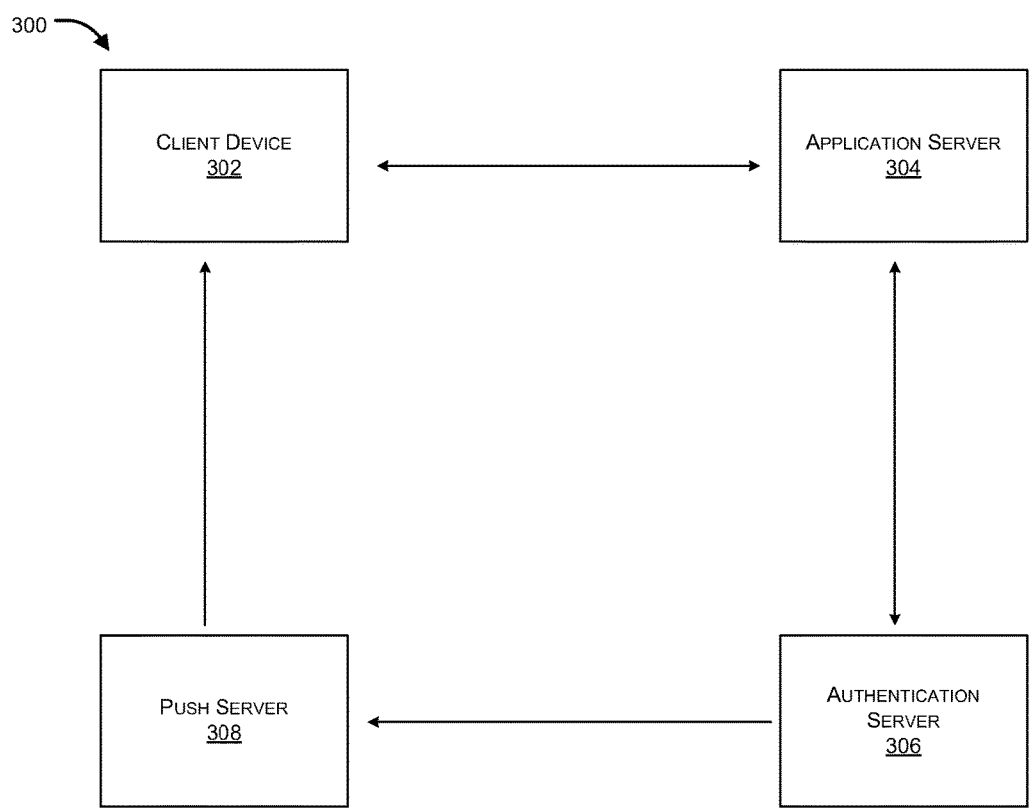
FIG. 3 is a block diagram showing an exemplary automatic OTP validation based user authentication system in accordance with an embodiment of the present invention.

FIG. 3 is a block diagram showing an exemplary automatic OTP validation based user authentication system 300 in accordance with an embodiment of the present invention. As shown in FIG. 3, a client device 302 can send an access request along with a first set of user credentials to an application server 304. Application server 304 can determine access attributes associated with the access request, and validate the first set of user credentials. Application server 304 can then send at least a part of the user credentials (e.g., the user identifier) along with or without the access attributes to an authentication server 306, which can in turn, generate a first OTP to be associated with the user identifier and trigger a push server 308 to send a push notification to client device 302 to cause the user of client device 302 to verify the access request. Client device 302 can display the content of the push notification on a screen of client device 302 and prompt the user to confirm he/she initiated the access request associated with the displayed access attributes by verifying himself/herself, e.g., to an OTP generator application running on client device 302 by providing a PIN associated with the OTP generator application or through a biometric sensor (e.g., Touch-Id) of client device 302. Responsive to verification of the user to the OTP generator application, confirming the access request, a second OTP can be generated by the OTP generator application and forwarded to application server 304 (or to authentication server 306), which can match the first OTP generated by the authentication server 306 with the second OTP generated by the OTP generator application running on client device 302. As can be seen in FIG. 3, client device 302 and application server 304 can be connected through a bidirectional connection through a private or public network, and similarly application server 304 and authentication server 306 can be connected through a bidirectional connection via the private or public network. In an exemplary implementation, authentication server 306 and push server 308 can be connected through a unidirectional connection, and similarly push sever 308 and client device 302 can be connected through a unidirectional connection.

Figure 4:
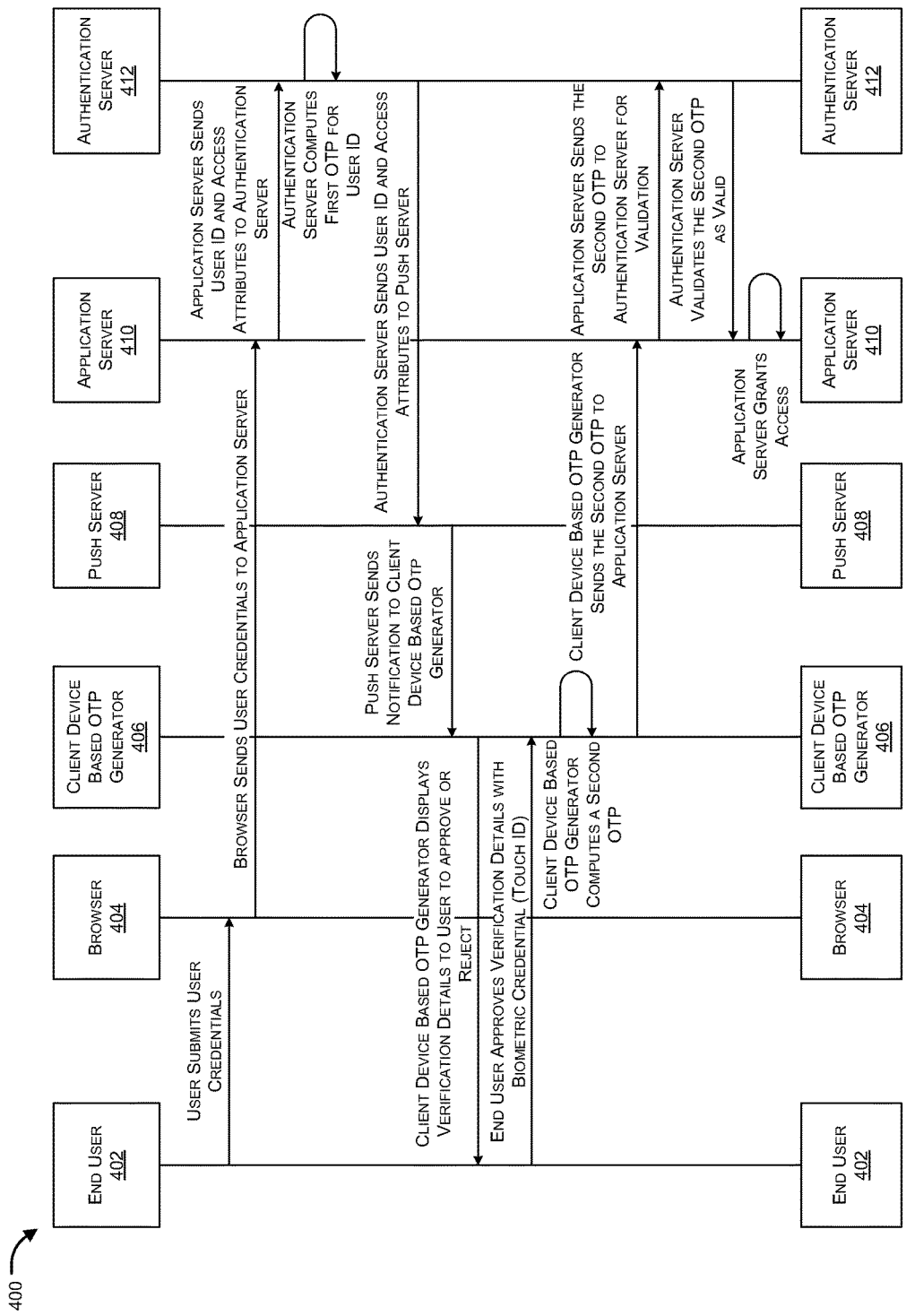
FIG. 4 illustrates an exemplary sequence diagram showing interactions among various components of an automatic OTP validation based user authentication system in accordance with an embodiment of the present invention.

FIG. 4 illustrates an exemplary sequence diagram 400 showing interactions among various components of an automatic OTP validation based user authentication system in accordance with an embodiment of the present invention. As shown in FIG. 4, a user 402 submits his/her user credentials to a browser 404, which forwards the user credentials along with an access request to an application server 410. Application server 410 sends a part of the user credentials (e.g., a user identifier) along with access attributes derived from the access request to an authentication server 412. In an exemplary implementation, application server 410 sends the user ID and the access attributes to authentication server 412 only if the user credentials (the first set of user credentials) are verified. In an alternate embodiment, the user credentials can be verified by authentication server 412, and hence application server 410 can share the complete set of received user credentials (instead of only the user identifier) with authentication server 412. In an exemplary implementation, upon successful authentication of the user credentials, authentication server 412 can generate a first OTP to be associated with the user identifier. If the user credentials are not successfully verified by application server 410 or by authentication server 412, authentication server 412 will not generate an OTP and the multi-factor authentication process fails.

Assuming a successful authentication of the user credentials, authentication server 412 can send the user ID and the access attributes to a push server 408, which can send a push notification including access attributes of the access request and the user ID to a client device. In an exemplary implementation, responsive to receipt of the push notification, the client device displays content from the push notification, also referred to as verification details to end user 402, and prompts end user 402 to approve or reject the corresponding access request. End user 402 can approve the notification/verification details by verifying himself/herself to client device based OTP generator 406, for example, with his/her biometric credentials (e.g., via Touch-Id) or by entering a PIN associated with client device based OTP generator 406. In an exemplary implementation, if the user rejects the notification or the biometric credentials provided by user do not match with the pre-stored biometric credentials, the client device based OTP generator 406 does not generate a second OTP.

Continuing with the present example and assuming successful verification of end user 402 to client device based OTP generator 406, client device based OTP generator 406 generates a second OTP and forwards it to application server 410, which can further forward the second OTP to authentication server 412 for validation. Authentication server 412 can validate the second OTP by comparing the second OTP with the first OTP. Responsive to receiving an indication from authentication server 412 that the second OTP is valid, application server 410 can then grant the access request and provide access to the protected network resource to end user 402.

In an exemplary implementation, the access request can be terminated (i) responsive to the user credentials provided by end user 402 (e.g., submitted through a web browser) not matching with the pre-stored user credentials at application server 410 or at authentication server 412, (ii) responsive to failure of end user 402 verifying himself/herself to client device based OTP generator 406, (iii) responsive to end user 402 rejecting the access request and/or (iv) responsive to the first OTP and the second OTP failing to match. In an exemplary implementation, an access request can also be terminated if all the required steps of the multi-factor authentication process are not completed within a predetermined or configuration time limit.

Figure 5:
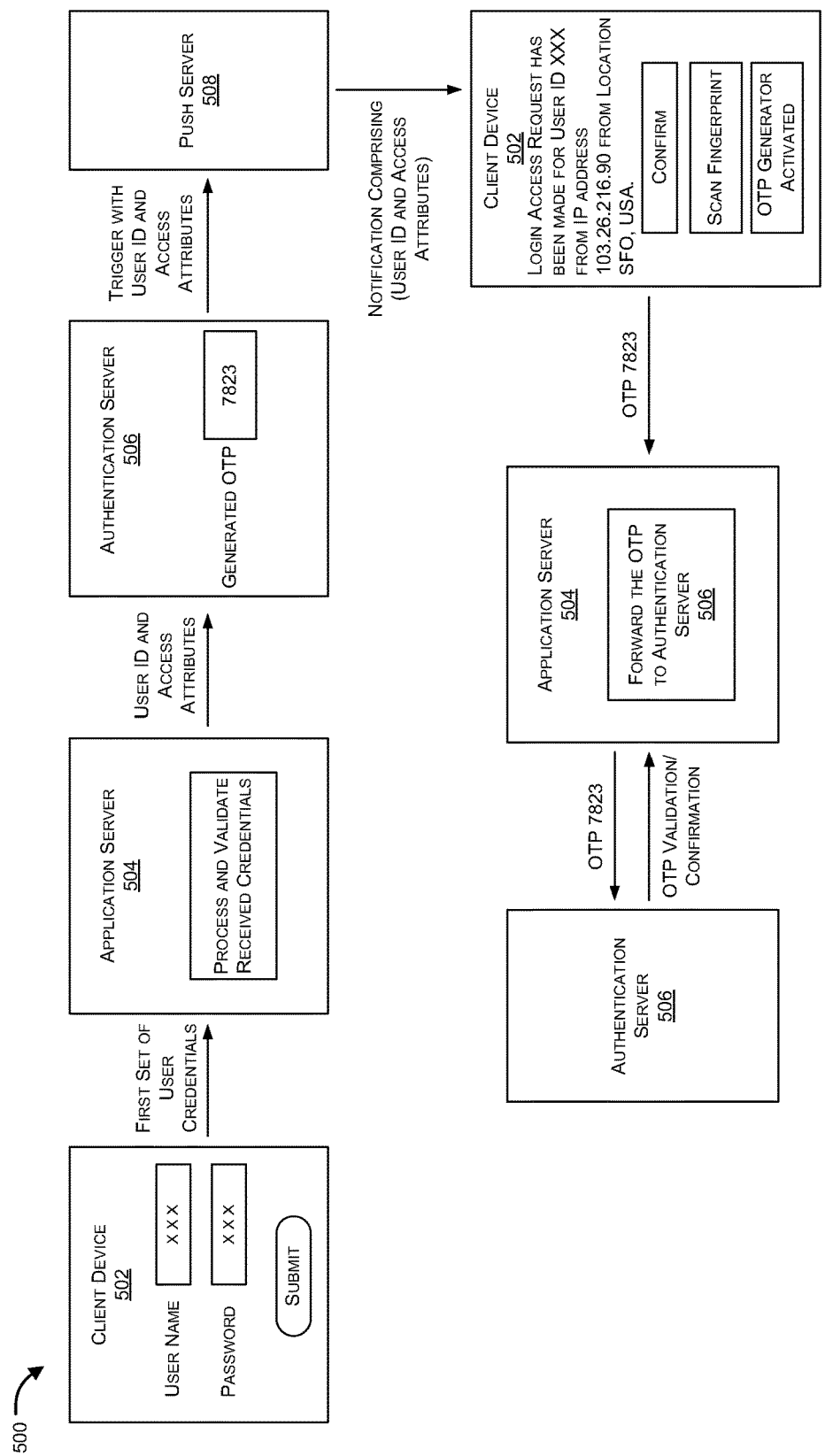
FIG. 5 is a conceptual illustration of interactions among various components of automatic OTP validation based user authentication system in accordance with an embodiment of the present invention.

FIG. 5 is a conceptual illustration of interactions among various components of an automatic OTP validation based user authentication system in accordance with an embodiment of the present invention. As shown in FIG. 5, an end user of a client device 502 may provide a first set of user credential (e.g., a username and password) in order to obtain access to a protected network resource of an application server 504. The first set of user credentials can be forwarded from client device 502 to application server 504, which can process and validate the received first set of user credentials. On successful verification of the user credentials, application server 504 can send a portion of the user credentials, for example the user identifier, along with derived access attributes associated with the access request to an authentication server 506. Authentication server 506 can generate a first OTP, for example "7823," responsive to receiving the received access attributes and/or the user identifier. In addition to generating the first OTP, authentication server 506 may also send a trigger with the user identifier and the access attributes to a push server 508 to cause push server 508 to generate and send a push notification containing the access attributes and the user identifier to client device 502. Client device 502 can display the content of the received push notification to the user of client device 502, prompting the user to verify the access request. A non-limiting example of the confirmation message displayed to the user can be "access request has been made for user ID XXX from IP address 103.26.216.90 from location SFO, USA". Those of ordinary skill in the art will appreciate various alternative confirmation messages may be used, including a part of the user credentials and the access attributes, for verification of the access request by the user. If the user has initiated the access request, he/she may validate the access request by providing an affirmative response to the notification, which will then wake the OTP generator application. At this point, via a configurable parameter, a biometric credential (e.g., via Touch-Id) or a PIN associated with OTP generator app residing in client device 502 verifies the user as an authorized user of the OTP generator app installed on client device 502 The biometric credential, e.g., a fingerprint scan, provided by the user can be matched with preconfigured biometric credentials previously provided by the authorized user of client device 502. Alternatively, if the user did not initiate the access request, he/she can reject the confirmation and the access request can be terminated by rejecting the notification to device 502.

In an exemplary implementation, upon successful authentication of the user via PIN or biometric credentials, the OTP generator running on client device 502 can generate a second OTP, for example "7823" that matches the first OTP, and provide the second OTP to application server 504, which can then forward the second OTP to authentication server 506 that can validate the second OTP and send a confirmation of validation to application server 504. Upon receiving an indication of successful confirmation, application server 504 can grant the user's access request and thereafter provide the user with access to the protected network resource.

Figure 6:
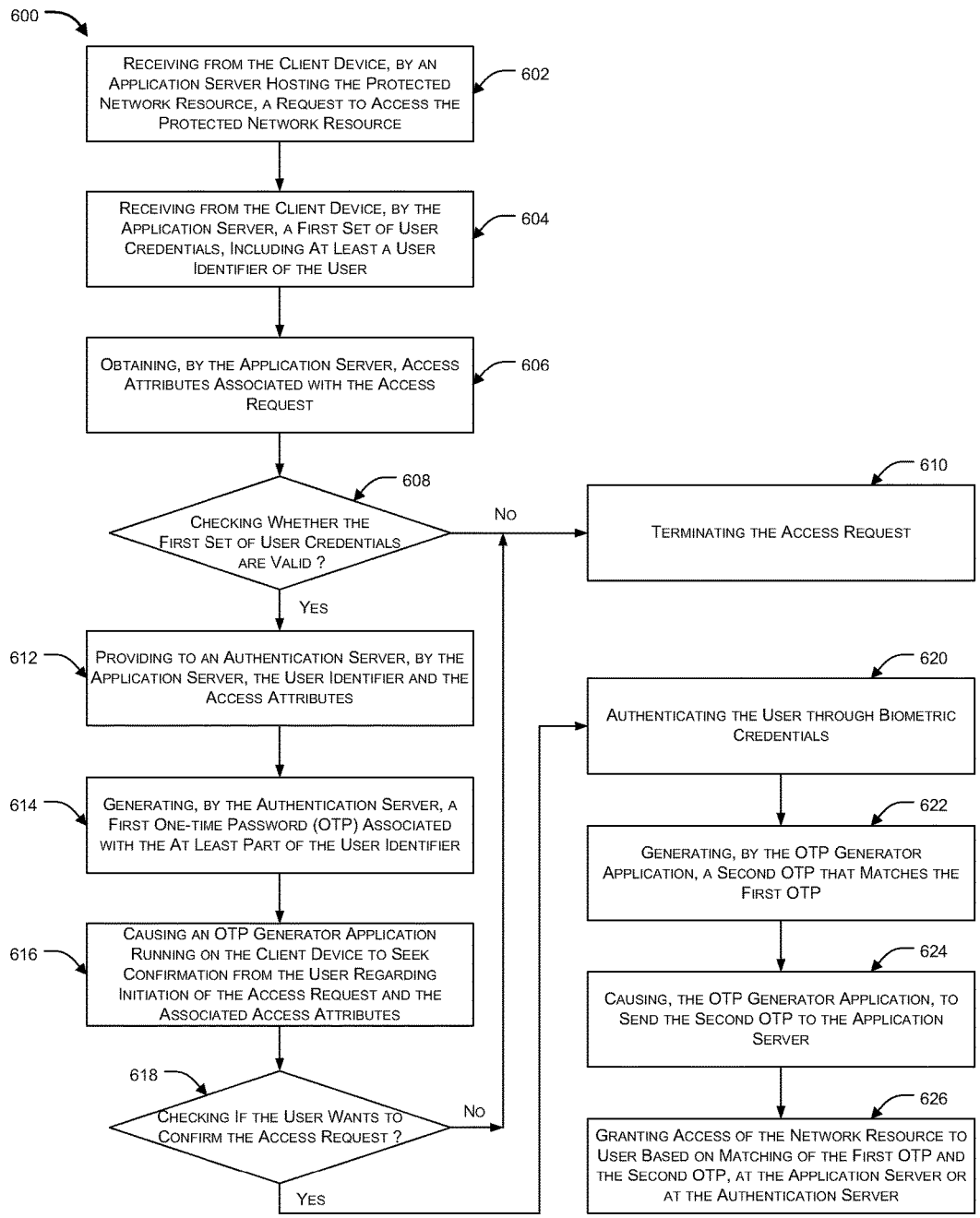
FIG. 6 is a flow diagram illustrating push service and automatic OTP validation based user authentication processing in accordance with an embodiment of the present invention.

FIG. 6 is a flow diagram 600 illustrating push service and automatic OTP validation based user authentication processing in accordance with an embodiment of the present invention. In the context of the present example, an exemplary method of granting a user of a client device access to a protected network resource using a push server and automatic OPT validation is described. The method includes the steps of receiving from the client device, by an application server hosting the protected network resource, a request to access the protected network resource, as shown at step 602; receiving from the client device, by the application server, a first set of user credentials including at least a user identifier of the user, as shown at step 604; obtaining, by the application server, access attributes associated with the access request, as shown at step 606; checking whether the first set of user credentials are valid as shown at step 608, and providing to an authentication server, by the application server, the user identifier and the access attributes, responsive to determining, by the application server, the first set of user credentials are valid as shown at step 612.

In an exemplary implementation, if the first set of user credentials are not valid, the access request can be terminated as shown at step 610 or the client can be challenged to reenter the first set of user credentials.

The method further includes the step of generating, by the authentication server, a first OTP to be associated with the user identifier, as shown at step 614; responsive to determining, by the application server, that the first set of user credentials are valid, causing an OTP generator application running on the client device to seek confirmation from the user regarding initiation of the access request and the associated access attributes as shown at step 616, by pushing, by the authentication server, the user identifier and access attributes to the client device through a push server; seeking confirmation by the user of the access request, as shown at step 618. In an exemplary implementation, if the user chooses not to confirm the access request, the access request is terminated. In an exemplary implementation, if the user chooses to confirm the access request, the method executes further steps of authenticating the user through biometric credentials, as shown at step 620, and responsive to receiving confirmation of the biometric credentials of the user, the OTP generator application generates a second OTP that matches the first OTP as shown at step 622.

The method further includes step of the OTP generator application sending the second OTP to the application server, as shown at step 624; and granting access of the network resource to the user responsive to matching of the first OTP with the second OTP at the application server or at the authentication server as shown step 626.

Figure 7:
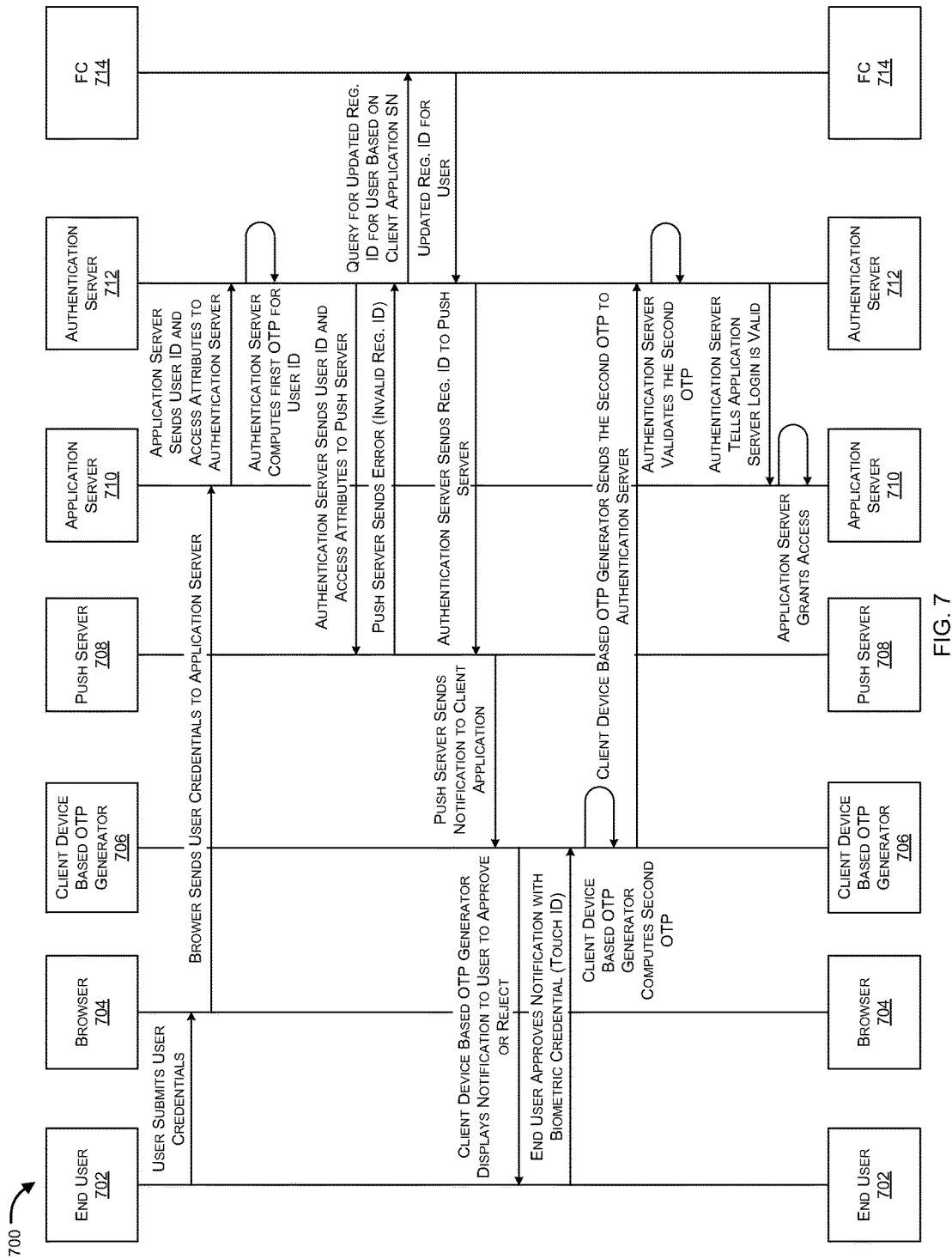
FIG. 7 illustrates another exemplary sequence diagram showing interactions among various components of an automatic OTP validation based user authentication system in accordance with an embodiment of the present invention.

FIG. 7 illustrates another exemplary sequence diagram 700 showing interactions among various components of an automatic OTP validation based user authentication system in accordance with an embodiment of the present invention. The sequence of events also indicate how the system can manage an invalid registration ID associated with an access request by a push server 708. As shown in FIG. 7, in an exemplary implementation, as part of an access request to a protected network resource hosted by an application server 710, a user 702 submits user credentials to a browser 704, which forwards the user credentials to application server 710. Application server 710 sends a part of the access credentials, for example, a user ID along with derived access attributes associated with the access request to an authentication server 712. In an exemplary implementation, application server 710 sends the user ID and the access attributes to authentication server 712 only if the user credential (the first set of user credentials) is verified.

Responsive to verification of the first set of user credentials, authentication server 712 generates a first OTP for the user ID and sends a trigger including the user ID and the access attributes to a push server 708, which, on receiving the trigger, can check if the registration ID associated with a client device based OTP generator 706 exists at push server 708. If the registration ID doesn't exist with push server 708, push server 708 can send an error indicating invalid registration ID (Reg. ID) to authentication server 712, which can then send a query for updated registration ID of the user based on client application ID to a provisioning system (FC) 714 coupled in communication with application server 710. Authentication server 712 can receive the updated registration (Reg.) ID for OTP generator 406 from FC 714, and forward the registration ID to push server 708. Push server 708, after receiving the registration ID, can identify the client device and send a push notification describing details of the access request (e.g., comprising the user ID and the access attributes) to the client device, which can then display the content of the push notification to end user 702 and prompt end user 702 to approve or reject the notification describing the details of the access request. End user 702 can approve the notification/verification details by providing biometric credentials (e.g., via Touch-Id) or a PIN associated with client device based OTP generator 706. In an exemplary implementation, if the user rejects the notification or if the biometric credentials or PIN provided by the user are invalid, client device based OTP generator 706 will not generate the second OTP.

Assuming successful verification of the biometric credentials, client device based OTP generator 706 can compute a second OTP and forward the second OTP to authentication server 712 directly. Authentication server 712 can validate the second OTP by comparing the second OTP with the first OTP. On receiving an indication from authentication server 712 that the second OTP is valid, application server 710 can grant end user 702 with access to the protected network resource.

Figure 8:
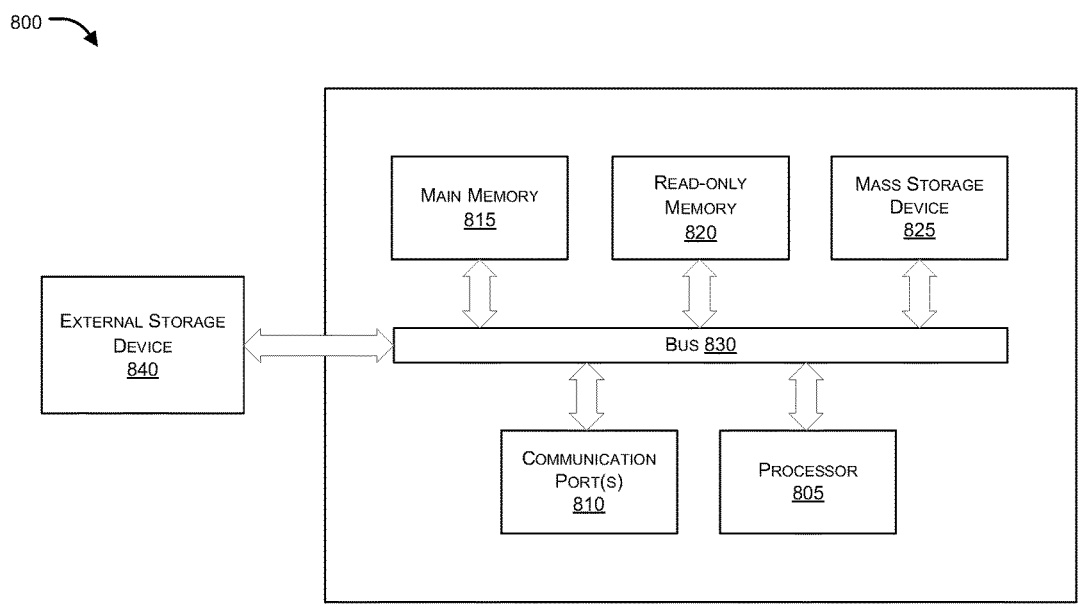
FIG. 8 is a block diagram of an exemplary computer system in which or with which embodiments of the present invention may be utilized.

FIG. 8 illustrates an exemplary a computer system 800, such as an end user computing device (e.g., computing device 102), a web, content or application server (e.g., application server 106), an authentication server (e.g., authentication server 108) or a push server (e.g., push server 208) in which or with which embodiments of the present invention may be utilized.

According to the present example, the computer system includes a data bus 810, at least one processor 820, at least one communication port 830, a main memory 840, a removable storage media 850, a read only memory 860, and a mass storage 870. Processor(s) 820 can be any know processor, such as, but not limited to, an Intel® Itanium® or Itanium 2® processor(s), or AMD® Opteron® or Athlon MP® processor(s), or Motorola® lines of processors. Communication port(s) 830 can be any of an RS-232 port for use with a modem based dialup connection, a 10/100 Ethernet port, or a Gigabit port using copper or fiber. Communication port(s) 830 may be chosen depending on a network such a Local Area Network (LAN), Wide Area Network (WAN), or any network to which the computer system 800 connects.

Main memory 840 can be Random Access Memory (RAM), or any other dynamic storage device(s) commonly known in the art. Read only memory 860 can be any static storage device(s) such as Programmable Read Only Memory (PROM) chips for storing static information such as instructions for processor 820. Mass storage 870 can be used to store information and instructions. For example, hard disks such as the Adaptec® family of SCSI drives, an optical disc, an array of disks such as RAID, such as the Adaptec family of RAID drives, or any other mass storage devices may be used. Data bus 810 communicatively couples processor(s) 820 with the other memory, storage and communication blocks. Data bus 810 can be a PCI/PCI-X or SCSI based system bus depending on the storage devices used. Removable storage media 850 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

The components described above are meant to exemplify some types of possibilities. In no way should the aforementioned examples limit the scope of the invention, as they are only exemplary embodiments.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method of granting a user of a client device access to a protected network resource, the method comprising:
    receiving from the client device, by an application server hosting the protected network resource, a request to access the protected network resource;
    receiving from the client device, by the application server, a first set of user credentials, having at least a user identifier of the user;
    obtaining, by the application server, access attributes associated with the access request;
    responsive to determining, by the application server, that the first set of user credentials are valid, providing to an authentication server, by the application server, the user identifier and the access attributes;
    generating, by the authentication server, a first one-time password (OTP) associated with the user identifier;
    causing the client device to seek confirmation from the user regarding initiation of the access request and the associated access attributes while also protecting against man-in-the-middle attacks and malware attacks, by pushing, by the authentication server, the access attributes to the client device via an encrypted push notification delivered by a push server; and
    responsive to receiving the confirmation from the user, by the client device, in a form of (i) authentication of the user to the client device via a biometric sensor of the client device; or (ii) authentication of the user to an OTP generator application running on the client device via a personal identification number (PIN) associated with the OTP generator application:
        generating, by the OTP generator application, a second OTP that matches the first OTP; and
        causing, by the OTP generator application, the application server to grant the access request by sending the second OTP to the application server or to the authentication server.

2. The method of claim 1, wherein the access attributes comprise one or more of a time associated with the access request, a geographic location from which the access request originated and a device identifier associated with the client device.

3. The method of claim 1, wherein the client device comprises a mobile phone, a smart watch, a smart phone, a tablet computer, a desktop computer or a laptop computer.

4. The method of claim 1, wherein the OTP generator application comprises a time-based OTP generator application or an event-based OTP generator application.

5. The method of claim 1, wherein the biometric sensor comprises a fingerprint sensor.

6. The method of claim 1, wherein the first set of user credentials comprises the user identifier and a password corresponding to the user identifier.

7. The method of claim 1, wherein said receiving from the client device, by the application server, a first set of user credentials, comprises receiving from a browser running on the client device, by the application server, the first set of user credentials.

8. A method of granting a user of a client device access to a protected network resource, the method comprising:
   receiving from the client device, by an application server hosting the protected network resource, a request to access the protected network resource;
   receiving from the client device, by the application server, a first set of user credentials, having at least a user identifier of the user;
   obtaining, by the application server, access attributes associated with the access request;
   responsive to validating, by the application server or an authentication server, the first set of user credentials, generating, by the authentication server, a first one-time password (OTP) associated with the user identifier;
   causing the client device to seek confirmation from the user regarding initiation of the access request and the associated access attributes while also protecting against man-in-the-middle attacks and malware attacks, by pushing, by the application server or the authentication server, the access attributes to the client device via an encrypted push notification delivered by a push server; and
   responsive to receiving the confirmation from the user, by the client device, in a form of (i) authentication of the user to the client device via a biometric sensor of the client device; or (ii) authentication of the user to an OTP generator application running on the client device via a personal identification number (PIN) associated with the OTP generator application:
      generating, by the OTP generator application, a second OTP that matches the first OTP; and
      causing, by the OTP generator application, the application server to grant the access request by sending the second OTP to the application server or to the authentication server.

9. The method of claim 1, wherein the access attributes comprise one or more of a time associated with the access request, a geographic location from which the access request originated and a device identifier associated with the client device.

10. The method of claim 1, wherein the client device comprises a mobile phone, a smart watch, a smart phone, a tablet computer, a desktop computer or a laptop computer.

11. The method of claim 1, wherein the OTP generator application comprises a time-based OTP generator application or an event-based OTP generator application.

12. The method of claim 1, wherein the biometric sensor comprises a fingerprint sensor.

13. The method of claim 1, wherein the first set of user credentials comprises the user identifier and a password corresponding to the user identifier.

14. The method of claim 1, wherein said receiving from the client device, by the application server, a first set of user credentials, comprises receiving from a browser running on the client device, by the application server, the first set of user credentials.

* * * * *